Patented Apr. 13, 1954

2,675,329

UNITED STATES PATENT OFFICE 2,675,329

PREPARATION OF METAL SULFONATE COMPOSITION

Frederick W. Schuessler, Valparaiso, Ind., and Thomas J. Wishlinski, Lansing, Ill., assignors to Standard Oil Company, Chicago, Ill., a corporation of Indiana No Drawing. Application August 30, 1951, Serial No. 244,476

6 Claims. (Cl. 106—285)

This invention relates to an improved process for manufacturing petroleum sulfonate compositions and bituminous compositions containing same. More particularly, it relates to an improved process whereby superior metal sulfonate-containing adjuncts for bituminous coating materials may be prepared from selected portions of sulfuric acid sludges resulting from the treatment of mineral oils with concentrated or fuming sulfuric acid.

Bituminous materials, such as normally liquid road oils and normally liquid to normally solid asphalts, are frequently compounded with various adjuncts to improve the adhesiveness of the bitumen to wet mineral aggregates. Among the various adjuncts employed for this purpose are those comprising soaps of sulfonic acids, particularly the alkaline earth metal and heavy metal soaps of sulfonic acids obtained in the treatment of hydrocarbon oils with concentrated or fuming sulfuric acid. One source of such sulfonic acids is the sludge obtained in the treatment of hydrocarbon oils with sulfuric acid of about 95 per cent strength or above, and preferably fuming sulfuric acid. It is an object of the present invention to provide a method of preparing stable, homogenous adjuncts for incorporation in paving asphalts and the like containing water-insoluble sludge acid soaps.

A further object of the invention is to provide a method of preparing a superior metal sulfonate containing adjunct for bituminous materials which comprises an aromatic hydrocarbon and water-insoluble metal sulfonates derived from sulfuric acid sludge, said adjunct being stable and homogeneous.

Still another object of the invention is to provide a method of preparing a stable homogeneous adjunct for addition to paving bitumens which comprises a substantial proportion of a water-insoluble metal sulfonate obtained from an acid sludge, resulting from the treatment of a hydrocarbon oil with concentrated or fuming sulfuric acid, which adjunct displays an exceptionally effective ability to promote the adherance of bitumen to wet mineral aggregates. Other objects and advantages of the present invention will become apparent from the following description.

It has been discovered previously by our co-workers that a composition comprising the water-insoluble metal soaps of preferentially water-soluble sulfonic acids derived from acid sludge, an aromatic hydrocarbon, alcohol, a small amount of water and some mineral oil is particularly suitable as an adjunct for bituminous paving materials. Such a novel composition and a method of preparing same are described in copending application for Letters Patent Serial No. 108,428, filed August 3, 1949. A distinguishing feature of the present invention resides in the use of preferentially water-soluble sulfonic acids from only a selected portion of a sulfuric acid sludge rather than from a total sludge.

Briefly stated, a novel process is described in the copending application wherein a sludge resulting from acid treatment of a technical white oil or the like with concentrated or fuming sulfuric acid is substantially freed of unreacted sulfuric acid and then diluted with more than about 3 volumes of water for each volume of liver and mixed with sufficient basic compound to neutralize the sulfonic acids present therein; precipitated sulfonates are then mixed with an aromatic hydrocarbon, sufficient base added to neutralize any occluded acidic material, following which the aromatic hydrocarbon-sulfonate mixture is dehydrated and there is added to the dehydrated mixture from about 2 per cent to 15 per cent of an aliphatic alcohol. That process usually results in stable homogeneous sulfonate compositions of good coating ability but it has been found that such compositions are at times unstable, settle in a non-homogeneous two phase mixture and are inferior in ability to promote wet aggregate coating.

It has now been discovered that such difficulties can readily be eliminated and a superior adjunct can be consistently produced if the sludge is settled and the lower portion drawn off and discarded before the hydrolysis step. The sludge is freed of unreacted sulfuric acid by first diluting the sludge with water and/or steam until the concentration of unreacted sulfuric acid in the sludge is substantially reduced and any sulfuric acid esters are decomposed followed by settling and drawing off the weak sulfuric acid. The addition of water and/or steam to the sludge may hereinafter be referred to as "hydrolysis" of the sludge. As the sludge settles from the oil a predominant amount of the so-called "black acids" present therein stratify in the lower portion of the sludge.

The black acids are the most water soluble of the petroleum sulfonic acids found in sludge and are insoluble in chloroform, naphtha, benzene, etc. When a complex mixture of sulfonates derived from sludge, said mixture containing mahogany soaps, green acid soaps, and black acid soaps, is mixed and shaken with chloroform and a 3:1 hydrochloric acid solution (i. e., a solution prepared by mixing 3 volumes of water with 1 volume of concentrated acid) a two phase system results upon settling in which the chloroform, containing sulfonates other than the black acid sulfonates, comprises the lower phase and hydrochloric acid comprises the upper phase with substantially all of the black acid soaps concentrated at the interface of the two solvents.

The black acids stratify from the less water-soluble sludge acids and may be removed to a substantial extent by drawing off the lower 10 to 60 per cent of the sludge and discarding the same. Depending to some extent upon the type of oil being treated and the sulfuric acid treating level at which the sludge is obtained, the formation of two distinct phases may or may not take place. The more fluid the sludge the greater likelihood of two phases, in which case removal of the lower liquid phase will remove most of the black acids. With or without such a clear cut phase separation, however, most of the black acids, after the sludge has settled, will be present in the lower portion of the sludge and may be readily drawn off. The process is then carried out employing only the top portion which is low in black acids and a homogeneous adjunct is readily prepared which is particularly effective as an additive in road oils and asphalts for promoting coating of wet aggregates.

In accordance with the present invention the stable homogeneous composition containing a water-insoluble metal salt of sulfonic acids derived from acid sludge resulting from the treatment of hydrocarbon oils such as lubricating oil distillates, with sulfuric acid of at least 95 per cent strength, may be obtained by forming such metal sulfonate in situ in the hydrolyzed acid sludge in the manner hereinafter described. Such a sludge resulting from the treatment of a mineral oil with sulfuric acid, preferably fuming, in a series of dumps of, for example, 0.5 pound of acid per gallon of oil per dump to a total of from about 0.5 to 9.0 pounds of acid per gallon of oil, is settled after each dump and the top layer from each stratification is combined in a total mix and hydrolyzed or the sludge from each dump may be combined and the draw-off made from the total sludge after a sufficient settling period. Following hydrolysis the mix is settled once again to permit separation of the weak sulfuric acid layer resulting from the hydrolysis. After withdrawing the weak sulfuric acid layer the remainder of hydrolyzed mix, commonly referred to as "liver," is diluted with water. It is important that the "liver" be sufficiently diluted with water at this point prior to the neutralization step, since in a properly diluted "liver" the metal sulfonate formed upon neutralization is preferentially precipitated rather than the metal sulfate thus resulting in a metal sulfonate of low inorganic salt content. The dilution required to obtain the preferential precipitation of the metal sulfonate is dependent upon the concentration of sulfonic acid and sulfuric acid in the "liver." In general, the "liver," or separated hydrolyzed sludge, should be diluted with more than about 3 volumes of water, and preferably at least 5 volumes of water for each volume of "liver." The diluted "liver" is then heated to a temperature of from about 90° F. to about 200° F. and preferably from about 120° F. to about 150° F. and the sulfonic acid is neutralized with a suitable neutralizing agent. Suitable neutralizing agents for use herein are, for example, an oxide, hydroxide or carbonate of the desired metal, for example, an alkaline earth metal such as calcium, strontium, barium or a heavy polyvalent metal such as lead, iron, zinc, copper, cobalt, manganese, etc., although the alkaline earth metals, particularly calcium are preferred. Other suitable neutralizing agents are basic nitrogenous compounds. The neutralizing agent is preferably added in the form of a slurry and the reacting mixture agitated such as by air blowing to accelerate the reaction and prevent excessive settling of the neutralizing agent. After the desired amount of the neutralizing agent has been added, the precipitated metal sulfonate is allowed to settle and the supernatant liquid drawn off, the aromatic hydrocarbon of the type hereinafter disclosed is added to the crude sulfonate mixture in amounts of from about 25 per cent to about 75 per cent by weight, and preferably from about 35 per cent to about 60 per cent by weight. After the crude sulfonate and the aromatic hydrocarbon are well mixed, sufficient neutralizing agent is added to completely neutralize the residual acidity of the material. The neutralized mixture of sulfonate and aromatic hydrocarbon is dehydrated to lower the water content to from about 1 per cent to about 35 per cent, and preferably from about 3 per cent to about 10 per cent.

The extent to which the neutralized product is dehydrated will depend to some extent upon the type of alcohol used. For example, when using alcohols of up to about five carbon atoms dehydration to a water content of from about 1 per cent to about 10 per cent is desirable, whereas when using higher alcohols, such as, for example, nonyl alcohol, cetyl alcohol, etc., dehydration to a water content of about 35 per cent will be sufficient to prevent phase separation. The dehydrated mixture is cooled to a temperature of at least about 150° F. and the mixture diluted with from about 2 per cent to about 15 per cent, and preferably from about 4 per cent to about 8 per cent of the aliphatic alcohol. After settling to remove excess amounts of inorganic salts, which may still be present, the mixture is ready for storage, or for compounding with the bituminous material.

It is important that the finished mixture contain no more than the maximum amount of water indicated above since the presence of larger amounts of water will increase the danger of phase separation of water, alcohol and soap mixture from the aromatic hydrocarbon. However, when the amount of water present is maintained within the above-mentioned limits a stable homogeneous product is obtained.

The sulfonate composition obtained in the manner described contains essentially the following components in the following approximate proportions:

|  | Range (Percent) | Preferred Range (Percent) |
| --- | --- | --- |
| Metal sulfonate | 10 to 50 | 20 to 30. |
| Aromatic hydrocarbon | 25 to 75 | 35 to 60. |
| Aliphatic alcohol | 2 to 15 | 4 to 8. |
| Water | 0 to 35 | 3 to 10. |
| Hydrocarbon oil | 0 to 30 | 5 to 10. |

Aromatic hydrocarbons suitable for use in accordance with the present invention are preferably those having a boiling point above about 220° F. at atmospheric pressures and includes mono-nuclear aromatic hydrocarbons, such as the xylenes, and poly-nuclear or condensed ring aromatics, such as naphthalenes, alkylated naphthalenes, such as methylated naphthalenes and ethylated naphthalenes, and mixtures of the higher boiling mono-nuclear aromatic hydrocarbons and poly-nuclear hydrocarbons.

A preferred source of mixed aromatic hydrocarbons suitable for use in the present invention is a light catalytic cycle stock obtained from a catalytic hydrocarbon cracking operation in which gas oil or heavier hydrocarbons, such as reduced crude, are cracked at a temperature of about 800° F. to 1050° F. at a pressure of about atmospheric to 50 pounds per square inch in the presence of suitable catalysts, such as for example, silica-alumina, silica-magnesia and other well-known cracking catalysts. A method of conducting a fluidized catalytic cracking operation is described in U. S. Pat. 2,341,193, issued to Fred W. Scheineman, February 8, 1944. The fraction suitable for use in the present invention is a heavier-than-gasoline fraction usually recycled to cracking. These fractions, depending upon their boiling range, are commonly referred to as light cycle stock and heavy cycle stock. A catalytic light cycle stock particularly well suited for this invention is a fraction having an aromatic content of at least about 40 to about 50 percent, and a distillation range between about 425° F. and about 560° F. A typical analysis of a suitable light catalytic cycle stock shows the material to be composed substantially of about 10 per cent normal $C_{12}$ to $C_{20}$ paraffins, about 45 per cent of other paraffins and naphthenes, about 5 per cent mono-nuclear aromatics which are mainly mono- to hexa-alkylated benzenes, and about 40 per cent poly-nuclear aromatics which are mainly alkyl naphthalenes, largely methylated naphthalenes. A typical light catalytic cycle stock will give the following A. S. T. M. distillation:

| | |
|---|---|
| Initial boiling point_____°F__ | 430 |
| 10% over_____°F__ | 448 |
| 50% over_____°F__ | 478 |
| 90% over_____°F__ | 518 |
| Maximum boiling point_____°F__ | 552 |

While we prefer to use a light cycle stock from a catalytic cracking operation of the type above-described, hydrocarbon fractions from other catalytic hydrocarbon conversion processes or thermal hydrocarbon conversion processes are suitable provided they have a sufficiently high aromatic content, at least 40 to 50 per cent, and have suitable distillation characteristics, i. e. boiling above about 220° F.

In place of using the whole catalytic cycle stock we may extract the aromatic components from the cycle stock and use the aromatic extract. The aromatics may be extracted by extraction with the usual and known solvents, such as for example, liquid hydrogen fluoride, nitromethane, liquid sulfur dioxide, etc.

Other mixed aromatic hydrocarbons suitable for use in the present invention are mixtures of aromatic hydrocarbons produced by the catalytic conversion of aliphatic hydrocarbons by the so-called hydroforming process. This mixture is known in the petroleum refining art as "catalytic reform naphtha bottoms," "hydroformer polymers," or "hydroformer bottoms." They will be referred to hereinafter as "hydroformer polymers." A process by which the hydroformer polymers are obtained is described in U. S. Patent No. 2,320,147. Briefly, the process comprises treating virgin or cracked naphtha or mixtures thereof with a solid porous hydroforming catalyst such as an oxide of a metal of group II to IV of the periodic system, such as the oxide of chromium or molybdenum, suitably supported on alumina or magnesia. The conversion is suitably carried out at a temperature of 850° F. to 1050° F. and, if desired, in the presence of hydrogen. The hydroformer products are fractionated by taking overhead a catalytically reformed gasoline of suitable end point and recovering the higher boiling materials as bottoms, which boil from about 400° F. to about 750° F., and have gravities of from about 10° API to about 18° API. A typical vacuum distillation of a hydroformer sample having a gravity of about 12° API shows the following composition:

| Fraction | Components |
|---|---|
| 0–2% | Toluene. |
| 2–8% | Xylenes. |
| 8–14% | 1,3,5-Trimethylbenzenes. |
| 14–17% | 1,3,4-Trimethylbenzene. |
| 17–22% | 1,2,3-Trimethylbenzene. |
| 22–27% | Tetramethylbenezene. |
| 27–37% | Naphthalenes. |
| 37–59% | Monomethylnaphthalenes. |
| 59–61% | Diphenyl. |
| 61–74% | Dimethylnapthalenes. |
| 74–78% | Methyldiphenyls. |
| 78–83% | Trimethylnapthalenes. |
| 83–87% | Fluorene. |
| 87–89% | Methylfluorenes. |
| 89–94% | Anthracene and Phenanthrene. |
| 94–97% | Methylanthracenes and Methylphenanthrenes. |
| 97–98% | Pyrene. |
| 98–100% | Tetracyclics and Higher. |

A representative hydroformer bottoms fraction exhibits the following physical properties:

| | |
|---|---|
| API gravity_____ | 11–22 |
| Refractive index $n_D^{20}$_____ | 1.5911 |
| Specific dispersion_____ | 264 |

ASTM distillation:

| | | |
|---|---|---|
| Initial | _____°F__ | 448 |
| 10% | _____°F__ | 465 |
| 20% | _____°F__ | 472 |
| 30% | _____°F__ | 477 |
| 40% | _____°F__ | 484 |
| 50% | _____°F__ | 490 |
| 60% | _____°F__ | 501 |
| 70% | _____°F__ | 516 |
| 80% | _____°F__ | 545 |
| 90% | _____°F__ | 620 |
| Max. (92% off) | _____°F__ | 750 |

Either the entire hydroformer polymer or lower boiling fractions thereof, such as the 0 to 90 per cent fraction boiling between about 400° F. and 600° F. or the 0 to 50 per cent fraction boiling between about 400° F. and 500° F. may be used.

The alcohol employed in the present invention is an aliphatic alcohol, such as for example, ethyl alcohol, propyl alcohol, isopropyl alcohol, butyl alcohol, and amyl alcohols, such as tertiary amyl alcohol. Higher alcohols of 9 to 16 carbon atoms and higher are not precluded; nonyl alcohol has been found to be operable.

While the preferentially water-soluble sulfonic acids employed in this invention may be obtained from acid sludges resulting from the treatment of viscous hydrocarbon oils having Saybolt Universal viscosity of from 80 seconds to 900 seconds at 100° F. with 0.5 to 9 pounds of concentrated or fuming sulfuric acid per gallon of oil being treated, it is preferred to employ the acid sludges obtained in the treatment of hydrocarbon oils with 2 to 4 pounds of fuming sulfuric acid per gallon of oil being treated.

The present invention will be more fully described and understood by reference to the following specific examples which are illustrative and in no way intended to limit the scope of the invention.

Example I

Ten gallons of naphthenic Kittrell Stanolind distillate, having a viscosity of 720 SSU at 100° F., a flash point of 380° F., API gravity of 21.3 and a pour point of —5° F. were treated with one-half pound dumps of fuming $H_2SO_4$ (104.5%) per gallon of oil to a total of 2.5 pounds of acid per gallon of oil. The sludge was permitted to settle from the oil after each dump. Of the 2.5 pound sludge, approximately the lower 60% was drawn off and separated from the top 40%. Both portions were hydrolyzed separately by mixing with water and live steam until the $H_2SO_4$ present was reduced to a concentration of about 30%. The separated weak $H_2SO_4$ was discarded in each case and the livers analyzed. The black acid content of the liver prepared from the lower 60% sludge portion was found to constitute 77% of the total sulfonates present in the liver. The black acid content of the liver prepared from the top 40% sludge portion was found to constitute only 28% of the total sulfonates in the liver.

Two hundred grams of the liver resulting from the top 40% portion of the sludge were diluted with 5 volumes of water and neutralized by adding 26.4 grams $Ca(OH)_2$ in the form of an aqueous slurry to precipitate the calcium soaps of the sulfonic acids. 157 grams of light catalytic cycle stock were added to the soap after the supernatant solution had been decanted. Since the mixture gave an alkaline reaction, no further neutralization was necessary and the mixture was dehydrated to a water content of about 3%. The viscosity of the mixture was adjusted by the addition of 15 cc. of isopropyl alcohol. The additive thus prepared when added in 2 per cent concentration to a cut back asphalt resulted in superior coating of wet aggregate. The liver obtained by hydrolyzing the bottom portion of the sludge defied processing and could not be made into an additive by the above described method. An attempt to prepare a suitable additive from such a total sludge without first withdrawing the black acids resulted in a two phase mixture during the dehydration step which could not be pumped, agitated or sampled.

Example II

A technical white oil sludge at the 2.5 pound level was settled and 2,700 gallons (37%) were withdrawn from the bottom and discarded and the remaining portion was then hydrolyzed. At the 3.0 pound treating level, a sludge was again settled and the lower 2,700 gallons (39%) thereof were withdrawn and discarded and the upper portion was hydrolyzed in the weak acid-liver mix resulting from hydrolysis of the 2.5 pound sludge. After settling, the weak acid resulting from hydrolysis was separated and discarded. In the laboratory 500 cc. of the combined liver were then diluted with 2,500 cc. of water and sufficient lime slurry (74 grams of lime) was added to totally neutralize all acidity and to precipitate calcium sulfonates. 100 grams of the precipitated soap were added to 70 cc. of light catalytic cycle stock and the mixture was dehydrated to 2.3% water. Approximately 10% of isopropanol was added to adjust the viscosity. During the dehydration step, no phase separation occurred between sulfonate and cycle stock and there was at all times an easily handled system which was stable and homogeneous. Attempts to prepare an adjunct from a total sludge of such an oil under similar conditions resulted in a mixture which was difficult, if not impossible, to handle because of separation between aromatic and soap during the dehydration step.

Example III

A combined liver was prepared in a manner similar to that described in Example II, above. Portions of 2.5 pound and 3.0 pound technical white oil sludges were used. The lower 2,600 gallons (40%) of the 2.5 pound sludge were removed and discarded and the upper remaining portion was hydrolyzed in 10,000 gallons of water. The same amount of a total 3.0 pound sludge having identical volume was withdrawn and discarded as in the case of the 2.5 pound sludge and the top portion was hydrolyzed in the liver-weak acid mixture resulting from the first hydrolysis. After settling, the weak acid resulting from the hydrolysis was separated from the liver and the liver was diluted with 81,500 gallons (approximately 5:1) of water and neutralized with 16,250 pounds of lime in water slurry. After settling, the supernatant water phase was discarded and 0.8 volume of light catalytic cycle stock was added to the precipitated soap. The resulting mixture was then dehydrated to 4.9% water. Approximately 1,800 gallons of isopropanol were added for final viscosity adjustment. Processing was smooth with no phase separation during the dehydration step and the adjunct thus prepared exhibited excellent coating properties, as indicated in Table I.

The sulfonate composition of the herein described invention is especially well suited as an additive for oils and bituminous coating materials such as road oils, asphalts, etc., to promote adherence to wet mineral aggregates, and to prevent or reduce the tendency of such materials to be stripped by water from mineral aggregates. The amount of the sulfonate composition to be used depends upon several factors, among which are the type of oil or bituminous materials employed, the area of the aggregate-bitumen interface, the chraacteristics of the aggregate material, the severity of the conditions of use, etc. It will be appreciated that these factors are interdependent to some extent, and that, therefore, the quantity of sulfonate composition which can be used most advantageouly will be determined for the individual combination of bitumen and aggregate. In general the amount of sulfonate composition used to produce the best effects should be sufficient to produce a bitumen composition having from about 0.5 per cent to about 5 per cent, of the 100 per cent metal sulfonate, based upon the bitumen used.

Set forth below, in Table I, are data indicating the effectiveness of adjuncts prepared in accordance with the present invention as compared to adjuncts prepared from total sludge without withdrawing a lower portion thereof. These data indicate the effect of such adjuncts in a commercial paving operation in which a mechanical paving machine was employed to lay an actual strip of highway. The results given are the consensus of several experienced observers' visual examination of the coated aggregate.

TABLE I

| | Type of Aggregate Coated | | | | | |
|---|---|---|---|---|---|---|
| | Wet Gravel (8.5 to 11.0% H₂O) | | Damp Limestone (1.9 to 2.5% H₂O) | | Wet Limestone (8.5 to 11.0% H₂O) | |
| | A[1] | B[2] | A[1] | B[2] | A[1] | B[2] |
| Percent Coating | 55 | 55 | 75 | 90 | 60 | 65 |
| Stripping resistance* | 0 | 20 | 30 | 85 | 5 | 45 |

*Percent coating retained after pouring water on freshly laid strip.
[1] Paving asphalt containing 2% of adjunct from total sludge.
[2] Paving asphalt containing 1% of adjunct from sludge from which lower 40% had been withdrawn prior to hydrolysis.

The amount of black acids which are present in a sulfuric acid sludge is dependent upon the type of oil treated and the amount and strength of sulfuric acid employed. The molecular weight and relative water solubility of the black acids are likewise affected by those factors. Whereas black acids may be found to some extent in practically every strata in a settled sludge, they are primarily found in the lower portions thereof. It has been found that at least 75 per cent of the black acids may be removed from most sludges by drawing off the lower 40 per cent thereof but it should be understood that in some sludges the black acids are such as to be more concentrated in the lowest portions of the sludge and, hence, substantially all of the black acids may be removed by drawing off an amount which is considerably less than 40 per cent of the total sludge. Thus, in accordance with the present invention, an amount of from about 10% to about 60% of the total sludge should be drawn off, preferably from about 30 to about 50, before proceeding with the hydrolysis step.

In addition to the amount and characteristics of the black acids, the viscosity of acid sludge itself is dependent to a considerable extent upon the type of oil treated and the amount and strength of the sulfuric acid employed. The consistency of acid sludges vary from relatively fluid pumpable sludges of rather high viscosity to a semi-solid sludge which is essentially unpumpable. As is well-known in the art, the viscosity of sulfuric acid sludges may be reduced by the addition thereto of sulfuric acid of from about 50 to about 100 per cent strength. It is often desirable, therefore, in accordance with the present invention, to mix such sulfuric acid with the sludge in order to increase the fluidity and aid the stratification of black acids.

Percentages given herein and in the appended claims are weight percentages unless otherwise stated.

We claim:

1. The method of preparing a stable homogeneous metal sulfonate-containing adjunct composition for bituminous material which comprises withdrawing a substantial portion from the bottom of a settled sulfuric acid sludge in order to remove most of the black acids present in said sludge, substantially freeing the remaining upper portion of said sludge from unreacted sulfuric acid, diluting the substantially sulfuric acid-free upper portion of said sludge with at least about 3 to about 5 volumes of water to each volume of sludge, adding to the diluted acid sludge portion a sufficient amount of a basic-reacting, polyvalent-metal compound to neutralize the sulfonic acids therein, adding from about 25% to about 75% of a liquid aromatic hydrocarbon having a boiling point of at least about 220° F., adjusting the water content to not more than 35% and adding from about 2% to about 15% of a alkanol.

2. The method of preparing a stable homogeneous metal sulfonate-containing adjunct composition for bituminous materials which comprises separating a bottom portion of from 10 to about 60% from a settled sulfuric acid sludge, substantially freeing the remaining upper portion of said sludge from unreacted sulfuric acid, diluting the substantially sulfuric acid-free upper portion of said sludge with about 5 volumes of water to each volume of sludge, adding to the diluted acid sludge portion a sufficient amount of a basic-reacting, polyvalent-metal compound to neutralize the sulfonic acids therein; adding from about 25% to about 75% of a liquid aromatic hydrocarbon having a boiling point of at least 220° F., adjusting the water content to not more than 35%, and adding from about 2% to about 15% of alkanol.

3. In the method of preparing a stable homogeneous metal sulfonate-containing adjunct composition for bituminous materials which comprises substantially freeing a settled acid sludge from unreacted sulfuric acid, diluting the sulfuric acid free sludge with about 5 volumes of water to each volume of sludge, adding sufficient basic-reacting, polyvalent-metal compound to the substantially sulfuric acid free sludge to neutralize the sulfonic acids therein, adding from about 25% to about 75% of a liquid aromatic hydrocarbon having a boiling point of at least about 220° F., adjusting the water content to no more than 35% and adding from about 2 to 15% of a alkanol thereto, the improvement which comprises discarding a bottom portion from about 10 to 60% from the settled acid sludge prior to the step of removing substantially all of the unreacted sulfuric acid therefrom, said discard of the bottom portion being effective to eliminate from the sludge a substantial amount of the black acids initially present therein.

4. The method of claim 1 in which the aromatic hydrocarbon is an aromatic fraction boiling from about 400° F., to about 750 °F., produced by the catalytic conversion of aliphatic hydrocarbons.

5. The method of claim 1 in which the alkanol is isopropyl alcohol.

6. The method of claim 1 in which the basic compound is an alkaline earth basic compound.

References Cited in the file of this patent

UNITED STATES PATENTS

| Number | Name | Date |
|---|---|---|
| 1,695,197 | Merrill | Dec. 11, 1928 |

OTHER REFERENCES

Sperling, "Journal Ind. and Eng. Chem." 40 890-7 (1948).